(12) United States Patent
Hao et al.

(10) Patent No.: US 12,380,726 B2
(45) Date of Patent: Aug. 5, 2025

(54) METHOD FOR IDENTIFYING HUMAN POSTURES AND GESTURES FOR INTERACTION PURPOSES AND PORTABLE HAND-HELD DEVICE

(71) Applicants: HONGFUJIN PRECISION ELECTRONS (YANTAI) CO., LTD., Yantai (CN); HON HAI PRECISION INDUSTRY CO., LTD., New Taipei (TW)

(72) Inventors: Yu-Hsiang Hao, New Taipei (TW); Chien-Heng Chen, New Taipei (TW); Yao-Che Peng, New Taipei (TW)

(73) Assignees: HONGFUJIN PRECISION ELECTRONS (YANTAI) CO., LTD., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 540 days.

(21) Appl. No.: 17/718,306

(22) Filed: Apr. 11, 2022

(65) Prior Publication Data
US 2023/0133168 A1 May 4, 2023

(30) Foreign Application Priority Data
Oct. 31, 2021 (CN) .......................... 202111278740.8

(51) Int. Cl.
*G06V 40/10* (2022.01)
*A63B 24/00* (2006.01)
*G06V 40/00* (2022.01)

(52) U.S. Cl.
CPC ............ *G06V 40/107* (2022.01); *G06V 40/00* (2022.01); *A63B 2024/0096* (2013.01);
(Continued)

(58) Field of Classification Search
CPC ...... G06V 40/10; G06V 40/107; G06V 40/00; A63B 24/00; A63B 2024/0096;
(Continued)

(56) References Cited

U.S. PATENT DOCUMENTS 10,659,731 B2 * 5/2020 Harrison ................. G06T 7/246
11,222,434 B2 * 1/2022 D'Souza ................ G06V 40/10
(Continued)

FOREIGN PATENT DOCUMENTS

CN 109284681 A * 1/2019 ......... G06K 9/00335
CN 110472459 A * 11/2019 ......... G06K 9/00268
(Continued)

*Primary Examiner* — Stephen R Koziol
*Assistant Examiner* — Benedict E Lee
(74) *Attorney, Agent, or Firm* — ScienBiziP, P.C.

(57) ABSTRACT

A method of detecting and identifying postures and gestures of a human user generates a reference model from a reference image and obtains an image of action or gesture being performed. The image is of a user and his flexible and hand-held portable device, and the image comprises a second identification feature. A state of a second feature of the second identification feature in the reference model can generate posture identification. The state of the second feature comprises size, shape, and location of the second identification feature in the hands of the user. A portable device and a non-volatile storage medium of a computer are also disclosed.

8 Claims, 9 Drawing Sheets

(52) U.S. Cl.
CPC ....... *A63B 2208/02* (2013.01); *A63B 2220/05* (2013.01); *A63B 2220/833* (2013.01); *A63B 2230/62* (2013.01)

(58) Field of Classification Search
CPC ............ A63B 2208/02; A63B 2220/05; A63B 2220/833; A63B 2230/62
See application file for complete search history.

(56) References Cited

U.S. PATENT DOCUMENTS

| | | | | |
|---|---|---|---|---|
| 11,501,487 | B2* | 11/2022 | Park | G06T 15/205 |
| 11,670,013 | B2* | 6/2023 | Patel | A61B 5/444 |
| | | | | 345/592 |
| 11,854,308 | B1* | 12/2023 | Marsden | G06V 40/113 |
| 11,893,759 | B2* | 2/2024 | Mirza | G06V 20/52 |
| 11,961,601 | B1* | 4/2024 | Kissos | G16H 20/30 |
| 2009/0290791 | A1* | 11/2009 | Holub | G06V 20/40 |
| | | | | 382/164 |
| 2013/0215148 | A1* | 8/2013 | Antonyuk | G06F 3/017 |
| | | | | 345/633 |
| 2014/0123507 | A1* | 5/2014 | Gupta | G06T 7/70 |
| | | | | 33/1 M |
| 2021/0248358 | A1* | 8/2021 | Lee | G06F 18/214 |
| 2022/0270387 | A1* | 8/2022 | Bai | G06T 17/00 |
| 2023/0095328 | A1 | 3/2023 | Yamano et al. | |
| 2023/0111489 | A1* | 4/2023 | Zohar | G06V 40/103 |
| | | | | 345/633 |
| 2023/0401819 | A1* | 12/2023 | Yoshida | G06V 40/10 |
| 2024/0103105 | A1* | 3/2024 | Possanzini | G01R 33/34084 |
| 2024/0119620 | A1* | 4/2024 | Ishihara | G06V 40/23 |

FOREIGN PATENT DOCUMENTS

| | | | | | |
|---|---|---|---|---|---|
| JP | 2012043308 | A | * | 3/2012 | |
| JP | 2014095557 | A | * | 5/2014 | |
| KR | 1020100014198 | A | | 2/2010 | |
| TW | M581492 | U | | 8/2019 | |
| WO | WO-2018098635 | A1 | * | 6/2018 | .......... G01C 21/005 |
| WO | WO-2021192589 | A1 | * | 9/2021 | ............. G06F 3/011 |

* cited by examiner

METHOD FOR IDENTIFYING HUMAN POSTURES AND GESTURES FOR INTERACTION PURPOSES AND PORTABLE HAND-HELD DEVICE

FIELD

The subject matter herein generally relates to field of human-machine interaction, more specifically to a posture identification method and a posture identification device.

BACKGROUND

User can make various gestures by holding portable equipment, so as to interact with interactive devices, and operate interactive devices to perform preset actions, such as playing videos corresponding to a certain posture, and operating game characters to perform a specified action. The determination of user posture by interactive equipment is often realized through the cooperation of various sensors on portable equipment, such as inertial sensors. The weight of portable equipment is thus increased, and when some sensors are damaged, recognition of human posture and gesture can be lost, causing the interactive equipment to be unable to act through the user's action.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
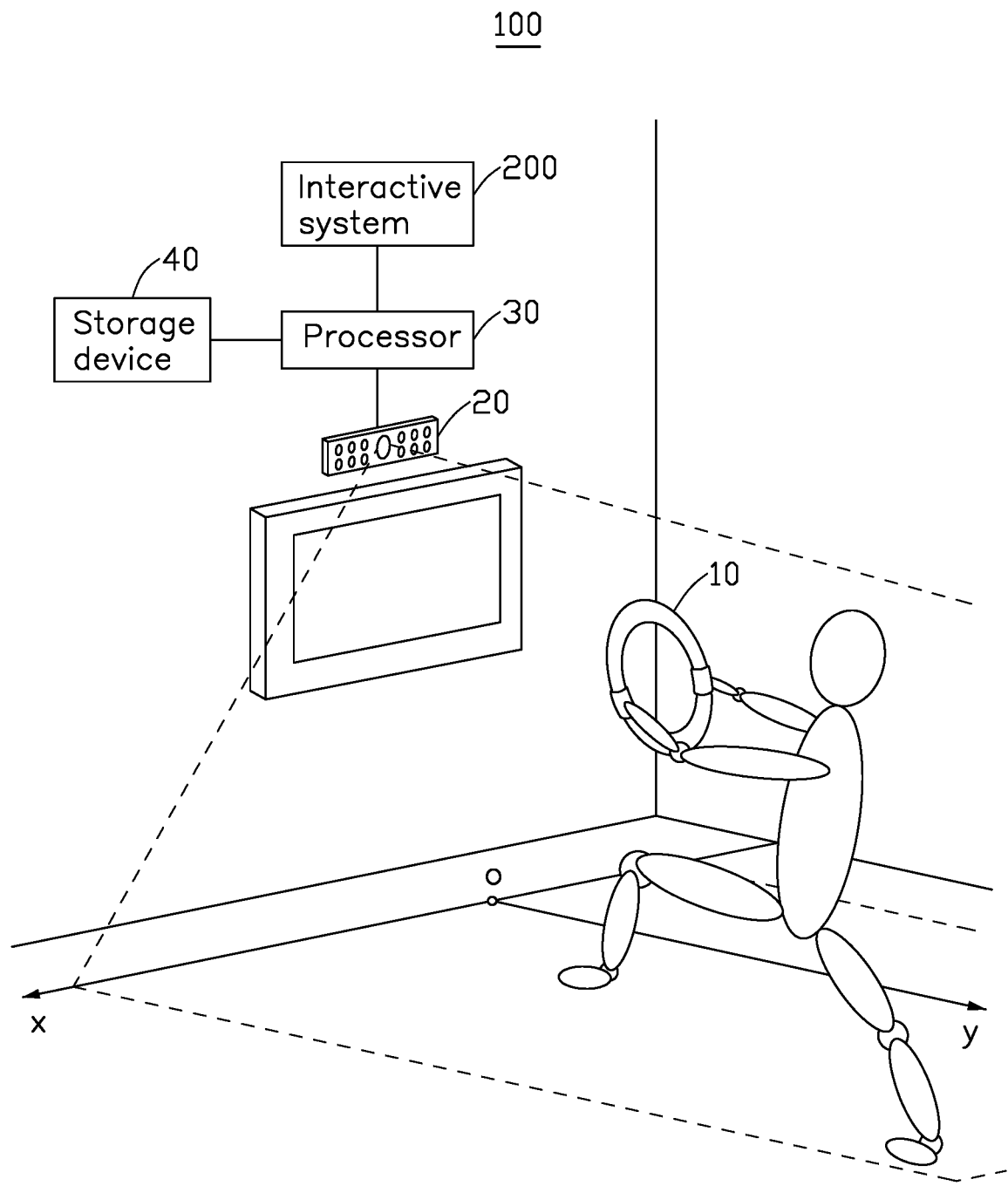
FIG. 1 is block diagram of an embodiment of a posture identification device according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a posture identification device 100 in accordance with an embodiment of the present disclosure.

As shown in FIG. 1, the posture identification device 100 includes a portable device 10, an image collector 20, a processor 30, and a storage device 40.

The portable device 10 is hand-held by the user. The user interacts with an interactive system 200 by holding the portable device 10 and changing the position, inclination angle, and shape of the portable device 10.

The portable device 10 can be a flexible device, and the user can apply force to the portable device 10 to change the shape of the portable device 10. In the embodiment of the present disclosure, the specific shape of the portable device 10 is not limited.

For example, the portable device 10 can be circular, and two handle portions 13 are arranged at both ends of the portable device 10, and an azimuth indicating portion 14 is arranged at one end of the portable device 10. The user holds the handle portion 13 with both hands and sets the azimuth indicating portion 14 upward. This posture can be the initial posture when the user operates the portable device 10.

The image collector 20 can be used to obtain image of a current action when the user holds the portable device 10 and poses a certain way. The image collector 20 is in communication with the processor 30 and the image collector 20 inputs the collected image to the processor 30.

Figure 2:
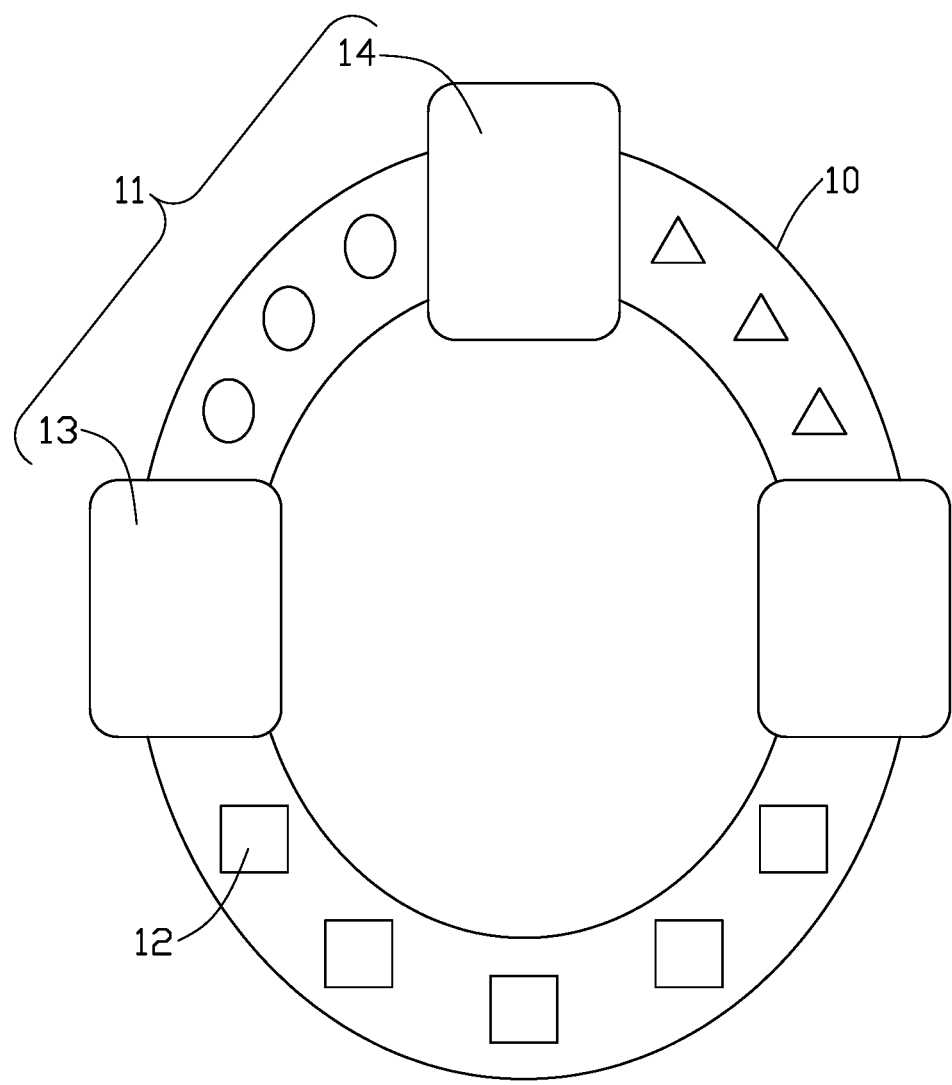
FIG. 2 is a block diagram of an embodiment of a portable device according to the present disclosure

Referring to FIG. 2, in one embodiment, the portable device 10 includes a plurality of modeling entity features 11 and a plurality of identifying entity features 12. When the image collector 20 collects the image of the user operating the portable device 10, the plurality of the modeling entity features 11 and the identifying entity features 12 are included in the image at the same time. The processor 30 can establish a reference model after analyzing and processing the features on the image corresponding to the modeling entity feature 11, input the action image into the reference model, determine the shape of the feature corresponding to the identifying entity features 12 in the reference model, and the posture made by the user when operating the portable device 10 at this time can be determined.

The plurality of the modeling entity features 11 and the plurality of the identifying entity features 12 are features arranged on the entity of the portable device 10, which can be but are not limited to, maps, pigment coatings, and protrusions of different colors and shapes, and can also be but not limited to active or passive signal generating devices.

For example, the portable device 10 may be in a circular shape, and the handle portion 13 and the azimuth indicating portion 14 are the modeling entity features 11. The handle portion 13 is circular and is sleeved on the portable device 10, two handle portions 13 are located on each side of the portable device 10, the azimuth indicating portion 14 is fixed at one end of the portable device 10. The azimuth indicating portion 14 is an active signal generating device, specifically an infrared generating device.

The identifying entity features 12 on the portable device 10 is a plurality of rectangular bumps and a red coating, the rectangular bumps and the red coating are located in the space between the azimuth indicating portion 14 and the two handle portions 13 respectively.

The image collector 20 can be an electronic device with image acquisition function, which can be, but is not limited to, a camera, a digital camera, a mobile phone camera. The image collector 20 can also be an electronic device with the function of acquiring spatial information through spatial scanning, which can be, but is not limited to, light detection and ranging (LIDAR), or laser scanner.

The processor 30 may be a general central processing unit (CPU), a microprocessor, an application specific integrated circuit (ASIC), or one or more integrated circuits for controlling the execution of the above program.

The storage device 40 can be used to store program segments. The processor 30 operates or executes the program segments stored in the storage device 40 and recalls data stored in the storage device 40, and implements various functions of the posture identification device 100.

The storage device 40 may be a read only memory (ROM) or other type of static storage device that can store static information and instructions, the storage device 40 can also be random access memory (RAM) or other types of dynamic storage devices that can store information and instructions, or electrically erasable programmable read only memory (EEPROM), compact disc read only memory (CD-ROM) or other optical disk storage, optical disc storage (including compact disc, laser disc, optical disc, digital versatile disc, blue ray disc, etc.), disk storage medium or other magnetic storage device, or any other medium that can be used to carry or store desired program code in the form of instruction or data structure and can be accessed by a computer.

The storage device 40 may exist independently and be connected to the processor 30 through a bus. The storage device 40 may also be integrated with the processor 30.

The processor 30 is in communication with the interactive system 200. The processor 30 determines the current posture of the user after analyzing and processing the received image, and outputs the corresponding posture information to the interactive system 200, so as to make the interactive system 200 respond accordingly.

For example, the portable device 10 may be an elastic fitness ring, and the interactive system 200 may be a fitness game console connected with a display. The handle portion 13 is arranged at both ends of the portable device 10, and the azimuth indicating portion 14 is arranged at one end of the portable device 10. When the user holds the handle portion 13 with both hands and sets the azimuth indicating portion 14 upward, the image collector 20 obtains the current action image of the user and inputs the action image to the processor 30. After the processor 30 analyzes and processes the action image, the processor 30 determines that the current posture of the user is a fitness preparation posture. The processor 30 outputs the posture information corresponding to the posture to the interactive system 200, the interactive system 200 can display a preset motion preparation interface through an external display.

When the user holds the handle portion 13 with both hands and sets the azimuth indicating portion 14 to point forward, while squeezing the portable device 10 with both hands to deform the portable device 10, the image collector 20 obtains the current action image of the user and inputs the action image to the processor 30. After the processor 30 analyzes and processes the action image, the processor 30 determines the current posture of the user is a healthy arm posture. The processor 30 outputs the posture information corresponding to the posture to the interactive system 200, and the interactive system 200 can display the image of the game character jumping through the external display.

It can be understood that the storage device 40 is used to store the application code for executing the posture identification method, and the execution is controlled by the processor 30. The processor 30 is used to execute the application code stored in the storage device 40 to analyze and process the action image.

Figure 3:
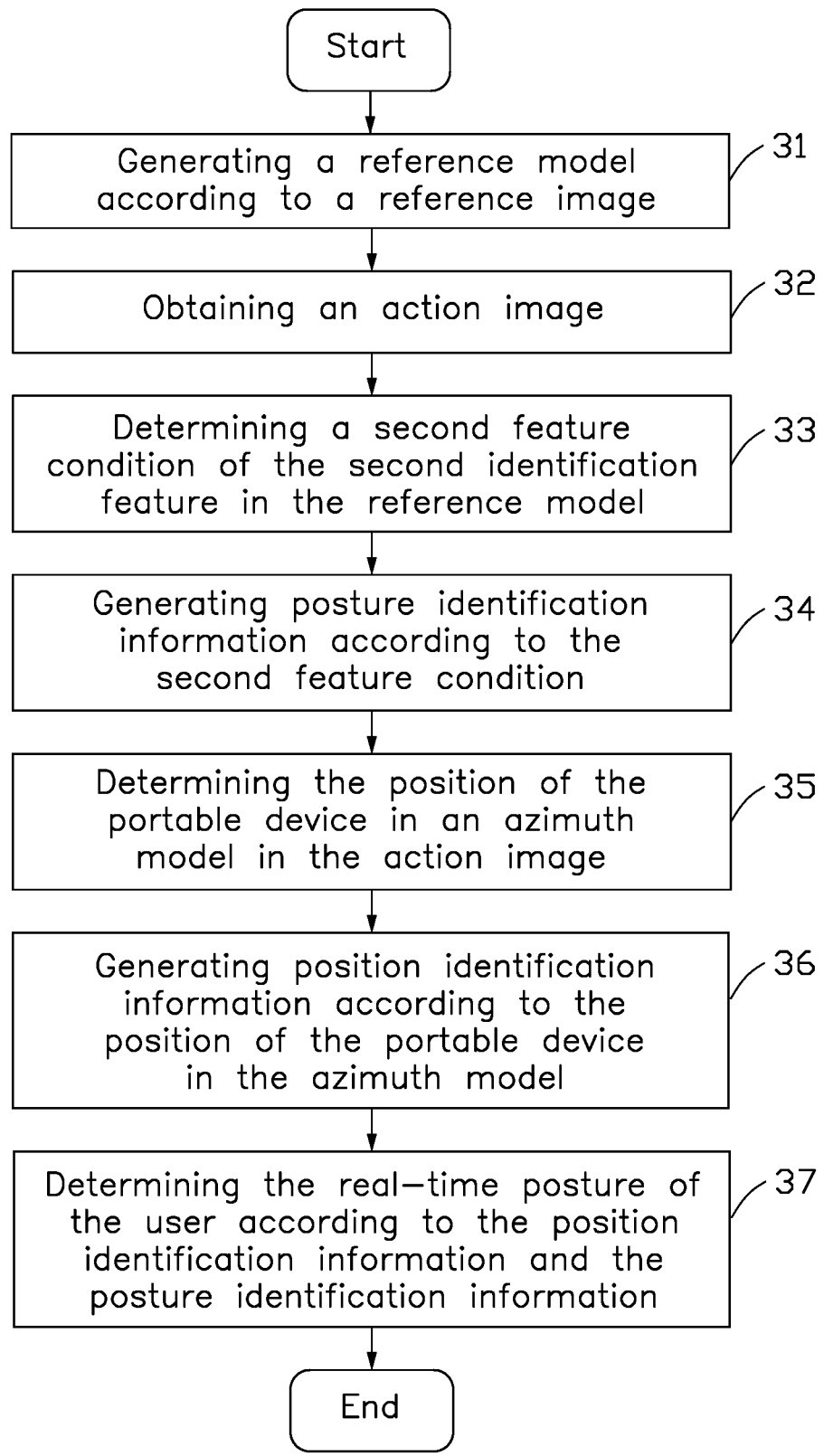
FIG. 3 is flowchart of an embodiment of a posture identification method according to the present disclosure.

FIG. 3 shows a flow chart of one embodiment of a posture identification method in accordance with an embodiment of the present disclosure. The posture identification may be applied to the posture identification device 100.

Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 31.

At block 31, generating a reference model according to a reference image.

In the embodiment, the reference image is an image when the user operates the portable device 10 and puts him in an initial posture.

For example, the portable device 10 may be an elastic object in a circular shape, and the initial posture may be a posture in which the user stands, holds handle portion 13 with both hands, and sets the azimuth indicating portion 14 pointing upward.

In a possible scenario, the reference image may be preset by the posture identification device 100 before leaving the factory. In another scenario, the reference image may be collected by the image collector 20 and input to the processor 30 when the user starts the image collector 20 for the first time and the user holds the portable device 10 and poses in the initial posture, the embodiment of the present disclosure is not limited to this.

When the user starts the image collector 20 for the first time when the reference image is collected by the image collector 20 and input to the processor 30, it is also necessary to obtain the reference image from the image collector 20 before proceeding to block 31.

In one embodiment, the reference model can be a reference coordinate system.

Figure 4:
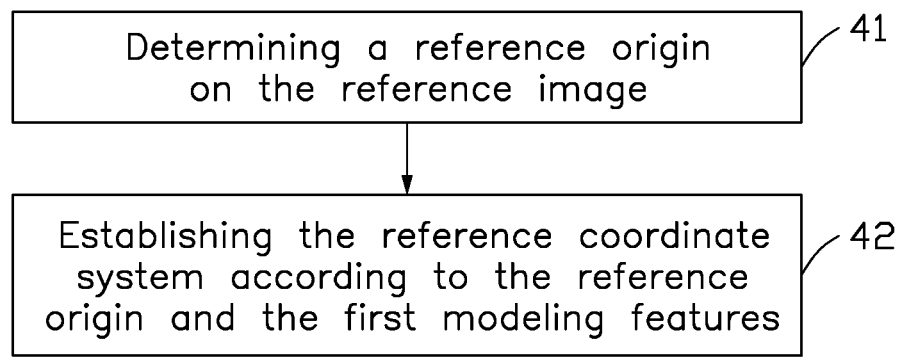
FIG. 4 is flowchart of another embodiment of the posture identification method according to the present disclosure.

Referring to FIG. 4, the specific method of generating the reference model may include the following steps:

At block 41, determining a reference origin on the reference image.

The reference origin can be one basis for establishing the reference model, and the reference origin can be obtained by analyzing the features on the reference image.

In one embodiment, the reference image includes a plurality of first modeling features, a plurality of the first modeling features corresponding to a plurality of the modeling entity features 11 on the portable device 10, and the reference origin can be obtained by identifying and analyzing the plurality of the first modeling features.

Figure 5A:
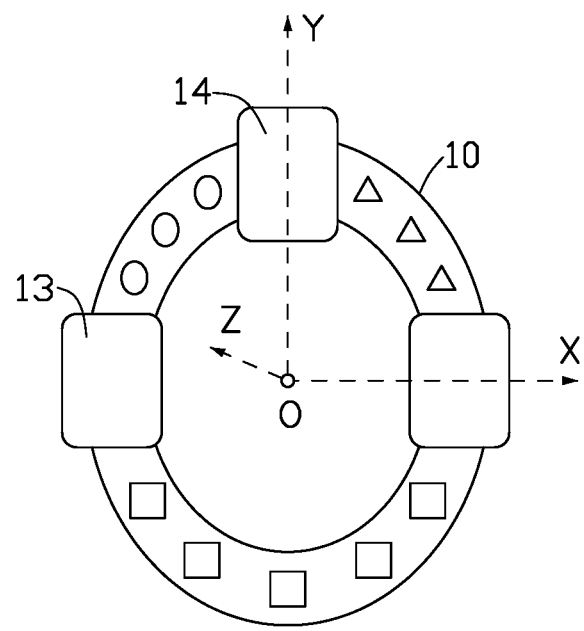
FIG. 5A is a schematic diagram of an embodiment of a reference coordinate system according to the method of the present disclosure.

Referring to FIG. 5A, for example, the portable device 10 may be an elastic member in a circular shape, the handle portion 13 arranged on both sides of the portable device 10 and the azimuth indicating portion 14 arranged at one end of the portable device 10 are the modeling entity features 11. In the reference image, a first line is formed by connecting the first modeling features corresponding to the two handle portions 13, and then a line segment perpendicular to the first line is made with the first modeling features corresponding to the azimuth indicating portion 14 as the starting point to form a second line. Finally, it can be determined that the intersection of the first line and the second line is the reference origin O.

In some embodiments, the reference image also includes a plurality of first identification features, the plurality of the first identification features corresponding to the plurality of the identifying entity features 12 on the portable device 10.

At block 42, establishing the reference coordinate system according to the reference origin and the first modeling features.

The number of axes of coordinates of the reference coordinate system can be any integer greater than or equal to 2, which is not limited by the embodiment of the present disclosure.

It can be understood that after determining the reference origin, and taking the reference origin as the origin of the coordinate system, the reference coordinate system can be established, and the coordinate axes of the reference coordinate system can be obtained through the identification and analysis of the first modeling features.

For example, the reference coordinate system is a two-dimensional coordinate system, the reference coordinate system takes the reference origin O as the origin, and the x-axis is determined based on the connecting line between the first modeling feature corresponding to the handle portion 13 and the reference origin O. The y-axis is determined based on the line between the first modeling feature corresponding to the azimuth indicating portion 14 and the reference origin O.

For example, the reference coordinate system is a three-dimensional coordinate system coordinate system, the reference coordinate system takes the reference origin O as the origin, and the X-axis is determined based on the connecting line between the first modeling feature corresponding to the handle portion 13 and the reference origin O. The Y-axis is determined based on the line between the first modeling feature corresponding to the azimuth indicating portion 14 and the reference origin O, finally determining a Z-axis perpendicular to the plane of X-axis and Y-axis with the reference origin O as the starting point.

It can be understood that the reference coordinate system is established on the reference image, so the first identification features is located in the reference coordinate system.

At block 32, obtaining the action image.

When the user operates the portable device 10 to pose in a specified posture, the image collector 20 collects the action image, and the processor 30 obtains the action image for analyzing and identifying the current posture of the user.

In some embodiments, the action image includes a plurality of second identification features, the plurality of the second identification features corresponds to the plurality of the identifying entity features 12. The processor 30 can determine the current posture of the user by determining the states of the second features of the second identification features in the action image.

In some embodiments, the action image includes a plurality of second modeling features, the plurality of the first modeling features corresponds to the plurality of the modeling entity feature 11. Another model different from the reference model can be established by analyzing the plurality of the second modeling features. The present disclosure can determine the difference between the action image and the reference image by docking the two models and so determining the current posture of the user.

At block 33, determining a state of a second feature of the second identification features in the reference model.

The state of the second feature includes the shape and size of the second identification feature and the positional relationship between the second identification feature with the reference origin.

When the user assumes different specified postures, the shape of the portable device 10, the deflection angle with the image collector 20, and the rotation angle of the portable device 10 can be different, and the shape, position, size of the identifying entity features 12 may also be different. The present disclosure can analyze the second identification feature, and the state of the obtained second feature can be used as the basis for determining the current posture of the user.

Figure 6:
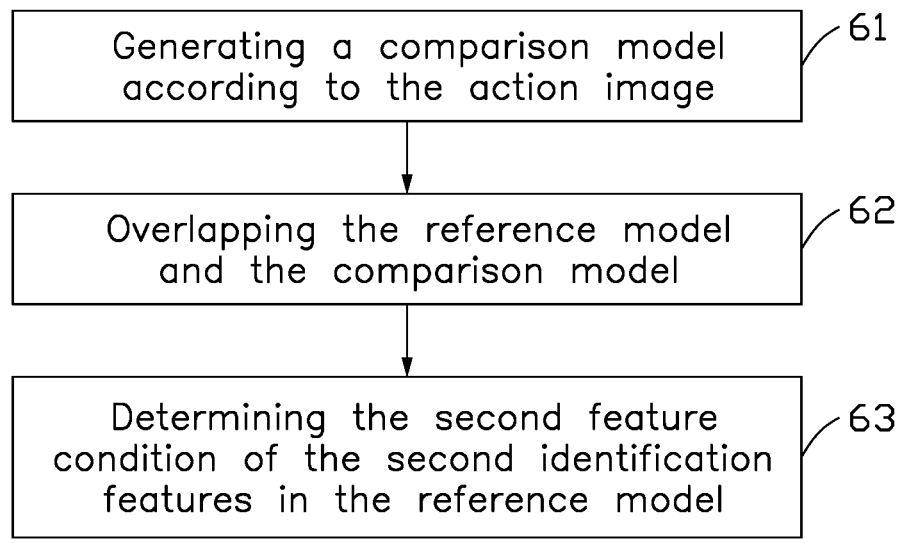
FIG. 6 is flowchart of another embodiment of the posture identification method according to the present disclosure.

Referring to FIG. 6, the specific method for determining the state of the second feature may include the following steps:

At block 61, generating a comparison model according to the action image.

It can be understood that, in a manner similar to that for generating the reference model from the reference image, the comparison model can be generated from the action image for determining the second feature. The comparison model can be a comparison coordinate system.

Figure 7:
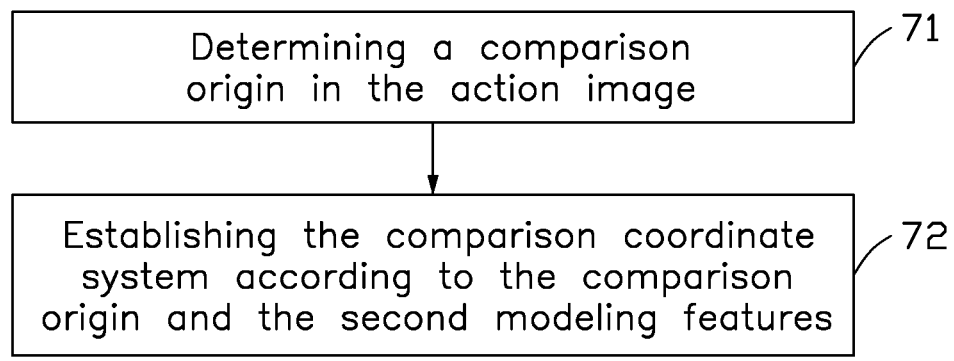
FIG. 7 is flowchart of another embodiment of the posture identification method according to the present disclosure.

Referring to FIG. 7, the specific method for generating a comparison model may include the following steps:

At block 71, determining a comparison origin in the action image.

The comparison origin can be one of the basis for establishing the comparison model, and the comparison origin can be obtained by analyzing the features on the action image. The comparison origin can be obtained by identifying and analyzing the second modeling features.

Figure 5B:
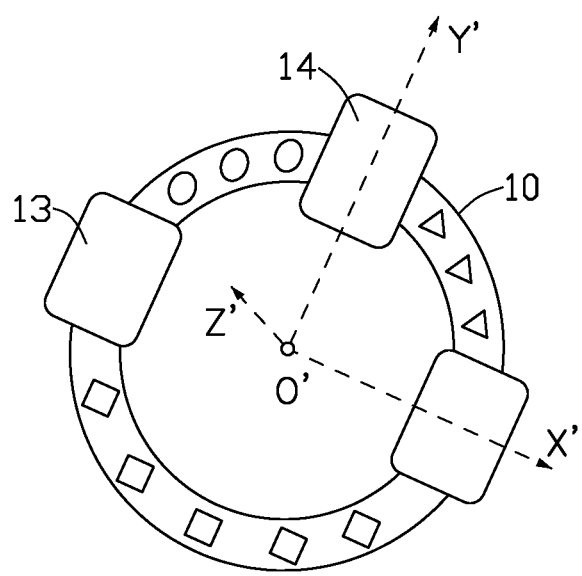
FIG. 5B is a schematic diagram of an embodiment of a comparative coordinate system according to the method of the present disclosure.

Referring to FIG. 5B, for example, the portable device 10 can be a circular elastic member. The handle portion 13 arranged on both sides of the portable device 10 and the azimuth indicating portion 14 arranged at one end of the portable device 10 are altogether the modeling entity features 11. In the action image, a third line is formed by connecting the second modeling features corresponding to the two handle portions 13, and then a line segment perpendicular to the third line is made with the second modeling features corresponding to the azimuth indicating portion 14 as the starting point to form a fourth line. Finally, it is determined that the intersection of the third line and the fourth line is the reference origin O'.

At block 72, establishing the comparison coordinate system according to the comparison origin and the second modeling features.

The number of the coordinate axes of the comparison coordinate system is equal to the coordinate axes of the reference coordinate system.

After the comparison origin is determined, the comparison coordinate system can be established by taking the comparison origin as the origin of the coordinate system, and the coordinate axis of the comparison coordinate system can be obtained by identifying and analyzing the second modeling features.

For example, the comparison coordinate system is a three-dimensional coordinate system, the comparison coordinate system takes the comparison origin O' as the origin, and the X'-axis is determined based on the connecting line between the second modeling feature corresponding to the handle portion 13 and the comparison origin O'. The Y'-axis is determined based on the line between the second modeling feature corresponding to the azimuth indicating portion 14 and the comparison origin O', finally, a Z'-axis perpendicular to the plane of X'-axis and Y'-axis is determined, with the comparison origin O' as the starting point.

It can be understood that the comparison coordinate system is established on the action image, so the second identification features is located in the comparison coordinate system.

At block 62, overlapping the reference model and the comparison model.

The reference model is the reference coordinate system, and the comparison model is the comparison coordinate system. The specific method of overlapping the reference model and the comparison model may be to overlap the reference origin and the comparison origin, so that the second identification features in the comparison coordinate system can be displayed in the reference coordinate system.

At block 63, determining the state of the second feature of the second identification features in the reference model.

The reference origin and each coordinate axis in the reference model are used as references. The second feature condition may include the shape, size, positional relationship with the reference origin, and deflection angle of the second identification feature.

The present disclosure can determine the positional relationship between the second identification feature and the reference origin by determining the coordinates of the second identification feature in the reference coordinate system.

The deflection angle of the second identification feature can be determined by comparing the included angle between the coordinate axis of the reference coordinate system and the coordinate axis of the comparison coordinate system. For example, when the X'-axis of the comparative coordinate system can be obtained by turning the X-axis of the reference coordinate system counterclockwise, it can be determined that the deflection angle of the second identification feature in the X-axis direction is a certain number of degrees.

It can be understood that the second feature condition of the second identification feature can be obtained by analyzing the second identification feature in the reference coordinate system, or by comparing the comparison coordinate system with the reference coordinate system.

The plurality of the second identification features may correspond to the plurality of the second feature conditions.

For example, the comparison coordinate system and the reference coordinate system are three-dimensional coordinate systems, after the comparison coordinate system is overlapped with the reference coordinate system, it can be known that the deflection angle of the second identification feature in the X-axis direction is a certain number of degrees through comparison. The second identification feature is in the shape of a round cake, and the coordinates of the center of the second identification feature in the reference coordinate axis are (3,1,1), then the above information is the second feature of the second identification feature.

At block 34, generating posture identification information according to the second feature condition.

The posture of the user is different, the action image is different, and the processor 30 can identify and analyze different second feature conditions.

In some embodiments, different second feature conditions correspond to different postures.

The storage device 40 can store a first database in which a plurality of different second feature conditions and the posture identification information corresponding to a plurality of different second feature conditions are recorded. When the second feature condition is determined, the processor 30 reads the first database from the storage device 40 and generates the posture identification information corresponding to the second feature condition.

Figure 8:
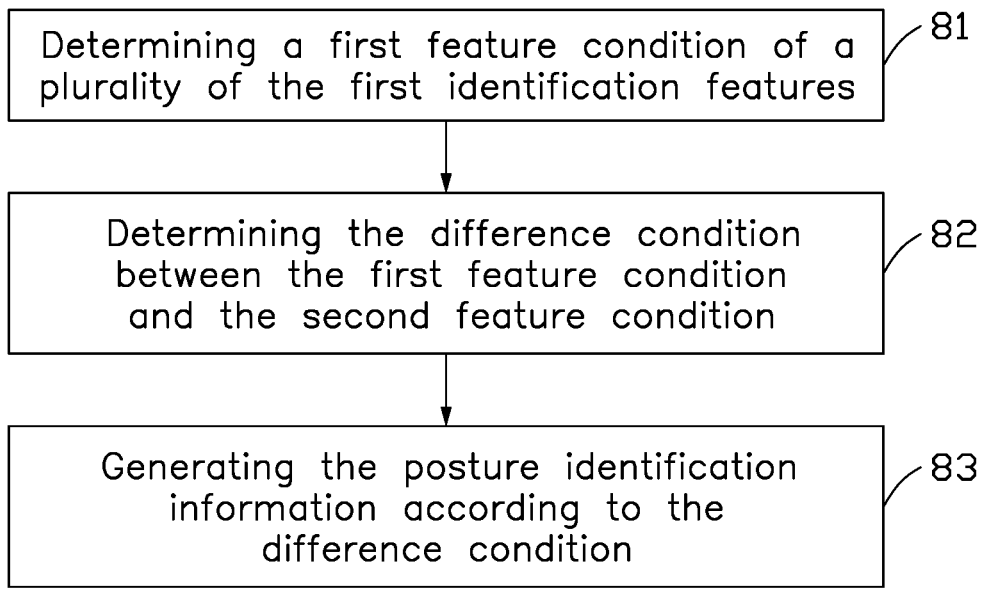
FIG. 8 is flowchart of another embodiment of the posture identification method according to the present disclosure.

Referring to FIG. 8, in another embodiment, the specific method of generating posture identification information according to the second feature condition may include the following steps:

At block 81, determining a first feature condition of a plurality of the first identification features.

It can be understood that, by taking the reference origin and each coordinate axis in the reference model as a reference, the first feature condition can include the shape and size of the first identification feature, and the positional relationship between the first identification feature and the reference origin.

The present disclosure can determine the positional relationship between the first identification feature and the reference origin by determining the coordinates of the first identification feature in the reference coordinate system.

It can be understood that a plurality of the first identification features can correspond to a plurality of the first feature conditions.

For example, the reference coordinate system is a two-dimensional coordinate system, the first identification feature is circular, and the coordinates of the center of the first identification feature in the reference coordinate axis are (3,1), then the above information is the first feature condition of the first identification feature.

At block 82, determining the difference in states between the first feature condition and the second feature condition.

The embodiment of the present disclosure can determine a plurality of the second identification features that are different from the first identification feature by comparing the first feature condition and the second feature condition, and be aware of the specific data difference between the second identification feature and the first feature condition. For example, there is a two-unit difference in length between the coordinates of the second identification feature and the coordinates of the first identification feature on the X-axis, and the deflection angle of the second identification feature in the X-axis direction is 10 degrees less than that of the first identification feature in the X-axis direction. The difference may include the case in the above example.

It can be understood that by determining such difference, the part that is different from the first identification feature can be known, and the second identification feature is formed through what changes the first identification feature has undergone. For example, the difference may include a two-unit difference in length between the coordinates of the second identification feature and the coordinates of the first identification feature on the X-axis, and it can be known that the second identification feature is formed by the first identification feature moving a length of two units in the X-axis direction.

At block 83, generating the posture identification information according to the difference condition.

It can be understood that different difference conditions can correspond to different posture identification information.

The storage device 40 can store a second database in which a plurality of different difference conditions and the posture identification information corresponding to a plurality of different difference conditions are recorded. When the difference condition is determined, the processor 30 reads the second database from the storage device 40 and generates the posture identification information corresponding to the difference condition.

At block 35, determining the position of the portable device in an azimuth model in the action image.

The azimuth model can be a two-dimensional coordinate system based on the preset direction with the image collector 20 as the origin. The establishment of the azimuth model does not need to depend on the features of the portable device 10.

For example, as shown in FIG. 1, the azimuth model can be a two-dimensional coordinate system in which the image collector 20 is taken as the origin O, the Y-axis is set in the direction of the front face of the image collector 20, and the X-axis is set in the direction perpendicular to the Y-axis.

The specific method of identifying the position of the portable device 10 in the azimuth model can be to identify the second identification feature or the second modeling feature in the action image, determine the coordinates of the second identification feature or the second modeling feature in the azimuth model, and identify the position of the portable device 10 through the coordinates.

For example, the azimuth model can be a two-dimensional coordinate system with the image collector 20 as the origin O, the Y-axis set in the direction facing the front of the image collector 20, and the X-axis set in the direction perpendicular to the Y-axis. The location of the portable device 10 is determined by identifying the second modeling feature corresponding to the azimuth indicating portion 14 in the azimuth model and determining the coordinates of the second modeling feature in the azimuth model.

At block 36, generating positional identification information according to the position of the portable device in the azimuth model.

It can be understood that for different positions of the portable device 10, there is a plurality of the position identification information.

For example, the storage device 40 can store a third database, which records the coordinates of a plurality of different second modeling features in the azimuth model and the position identification information corresponding to different coordinates. After determining the coordinates of the second modeling feature, the processor 30 reads the third database from the storage device 40 and generates the position identification information corresponding to the coordinates.

At block 37, determining the real-time posture of the user according to the position identification information and the posture identification information.

When the user poses in different postures, the positions of the portable device 10 is different. At the same time, the shape, deflection angle, and deflection direction of the portable device 10 are also different under the energy and extent of movement employed by the user. After analyzing the position identification information and the posture identification information, the real-time posture of the user can be determined more accurately.

It can be understood that different real-time postures correspond to different posture identification information and different position identification information.

For example, the storage device 40 stores a fourth database, and the fourth database records the corresponding different real-time postures after the combination of a plurality of different posture identification information and a plurality of different position identification information.

After determining the posture identification information and the position identification information, the processor 30 reads the fourth database from the storage area and generates in real-time the posture corresponding to the posture identification information and the position identification information.

Figure 9:
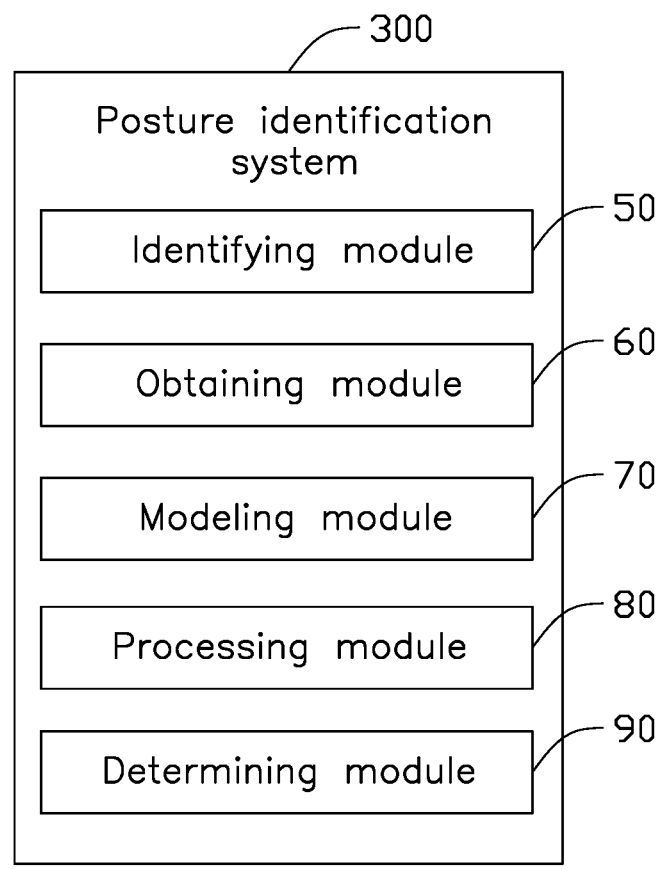
FIG. 9 is block diagram of an embodiment of a posture identification system according to the method of the present disclosure.

FIG. 9 illustrates a posture identification system 300 in accordance with an embodiment of the present disclosure.

The posture identification system 300 includes an identifying module 50, an obtaining module 60, a modeling module 70, a processing module 80, and a determining module 90.

The identifying module 50 is used to identify each of a plurality of the first modeling features and the first identification features in the reference image, and a plurality of the second modeling features and the second identification features in the action image.

The obtaining module 60 is used to obtain the action image.

The obtaining module 60 is also used to obtain the reference image.

The modeling module 70 is used to establish the reference model and the comparison model.

It can be understood that the reference model can be the reference coordinate system, and the reference origin and a plurality of coordinate axes of the reference coordinate system can be obtained by analyzing a plurality of the first modeling features.

The comparison model can be the comparison coordinate system, and the comparison origin and a plurality of the coordinate axes of the comparison coordinate system can be obtained by analyzing a plurality of the second modeling features.

The modeling module 70 is also used to establish the azimuth model.

The azimuth model can be a two-dimensional coordinate system based on the image collector 20 as the origin and the preset direction.

The processing module 80 is used to determine the second feature condition of the second identification feature in the reference model and generate the posture identification information according to the second feature condition.

The processing module 80 is also used to generate the position identification information according to the position of the portable device 10 in the azimuth model.

The determining module 90 is used to determine in real-time the posture according to the posture identification information and the position identification information.

It can be understood that different postures correspond to different posture identification information and different position identification information.

In the posture identification system described in FIG. 9, the specific shape of the portable device 10 can be determined through the analysis of the action image, so as to determine the real-time posture of the user and improve the convenience of using the posture identification device 100. For details, refer to the specific embodiment of the above posture identification method, which will not be described in detail here.

Based on the same idea, the embodiment of the present disclosure also provides a storage medium, which includes computer instructions. When the computer instructions run on the posture identification device 100, the posture identification device 100 is caused to execute the posture identification method provided by the embodiment of the present disclosure.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A posture identification method configured to identify posture of a user while operating a portable device and comprising:
generating a reference model according to a reference image;
obtaining an action image by an image collector; wherein the action image is an image comprising the user and the portable device, and the action image comprises a second identification feature; and
determining a second feature condition of the second identification feature in the reference model and generating posture identification information; and
wherein the second feature condition comprises size, shape and location of the second identification feature;
wherein the reference model is a reference coordinate system, the reference image comprises a first modeling feature, and the first modeling feature corresponds to a modeling entity feature on the portable device, wherein generating a reference model according to a reference image, comprises:
determining a reference origin in the reference image; and
establishing the reference coordinate system according to the reference origin and the first modeling feature;
wherein determining a second feature condition of the second identification feature in the reference model and generating posture identification information, comprises:
generating a comparison model according to the action image;
overlapping the reference model and the comparison model;
determining the second feature condition of the second identification feature in the reference model; wherein the second feature condition comprises shape and size of the second identification feature and positional relationship between the second identification feature and the reference origin; and
generating the posture identification information according to the second feature condition.

2. The posture identification method according to claim 1, wherein the action image comprises a second modeling feature, the second modeling feature corresponds to the modeling entity feature, and the comparison model is a comparison coordinate system, wherein generating a comparison model according to the action image, comprises:
determining a comparison origin in the action image; and
establishing the comparison coordinate system according to the comparison origin and the second modeling feature.

3. The posture identification method according to claim 2, wherein overlapping the reference model and the comparison model, comprises:
overlapping the reference coordinate system with the comparison coordinate system, wherein the reference origin is overlapped with the comparison origin.

4. A posture identification device comprising:
a portable device comprising identification entity feature and modeling entity feature;
an image configured to collect an action image when a user operates the portable device;
a storage device; and
at least one processor, wherein the storage device stores one or more programs, when executed by the at least one processor, the one or more programs cause the at least one processor to:
generate a reference model according to a reference image;
obtain an action image; wherein the action image is an image comprising the user and the portable device, and the action image comprises a second identification feature; and
determine a second feature condition of the second identification feature in the reference model and generating posture identification information; and
wherein the second feature condition comprises size, shape and location of the second identification feature;
wherein the reference model is a reference coordinate system, the reference image comprises a first modeling feature, the reference image comprises a first modeling feature, and the first modeling feature corresponds to a modeling entity feature on the portable device, wherein the at least one processor is further caused to
determine a reference origin in the reference image;
establish the reference coordinate system according to the reference origin and the first modeling feature;
generate a comparison model according to the action image;
overlap the reference model and the comparison model;
determine the second feature condition of the second identification feature in the reference model; wherein the second feature condition comprises shape and size of the second identification feature and positional relationship between the second identification feature and the reference origin; and
generate the posture identification information according to the second feature condition.

5. The posture identification device according to claim 4, wherein the action image comprises a second modeling feature, the second modeling feature corresponds to the modeling entity feature, and the comparison model is a comparison coordinate system, wherein the at least one processor is further caused to:
determine a comparison origin in the action image; and
establish the comparison coordinate system according to the comparison origin and the second modeling feature.

6. The posture identification device according to claim 5, wherein the at least one processor is further caused to:
overlap the reference coordinate system with the comparison coordinate system, wherein the reference origin is overlapped with the comparison origin.

7. A non-transitory storage medium having stored thereon instructions that, when executed by a processor of a computer device installed in a posture identification device, causes the processor to perform a posture identification method, wherein the method comprises:
generating a reference model according to a reference image;
obtaining an action image; wherein the action image is an image comprising the user and the portable device, and the action image comprises a second identification feature; and determining a second feature condition of the second identification feature in the reference model and generating posture identification information; and wherein the second feature condition comprises size, shape and location of the second identification feature;

wherein the reference model is a reference coordinate system, the reference image comprises a first modeling feature, and the first modeling feature corresponds to a modeling entity feature on the portable device, wherein generating a reference model according to a reference image, comprises:

determining a reference origin in the reference image; and establishing the reference coordinate system according to the reference origin and the first modeling feature;

generating a comparison model according to the action image;

overlapping the reference model and the comparison model;

determining the second feature condition of the second identification feature in the reference model; wherein the second feature condition comprises shape and size of the second identification feature and positional relationship between the second identification feature and the reference origin; and generating the posture identification information according to the second feature condition.

8. The non-transitory storage medium according to claim 7, wherein the action image comprises a second modeling feature, the second modeling feature corresponds to the modeling entity feature, and the comparison model is a comparison coordinate system, wherein generating a comparison model according to the action image, comprises:

determining a comparison origin in the action image; and establishing the comparison coordinate system according to the comparison origin and the second modeling feature.

* * * * *